May 25, 1965  J. M. PERKINS ETAL  3,184,832
METHOD OF MAKING AN EXPENDABLE ELECTRICAL CONNECTOR
Original Filed June 12, 1961
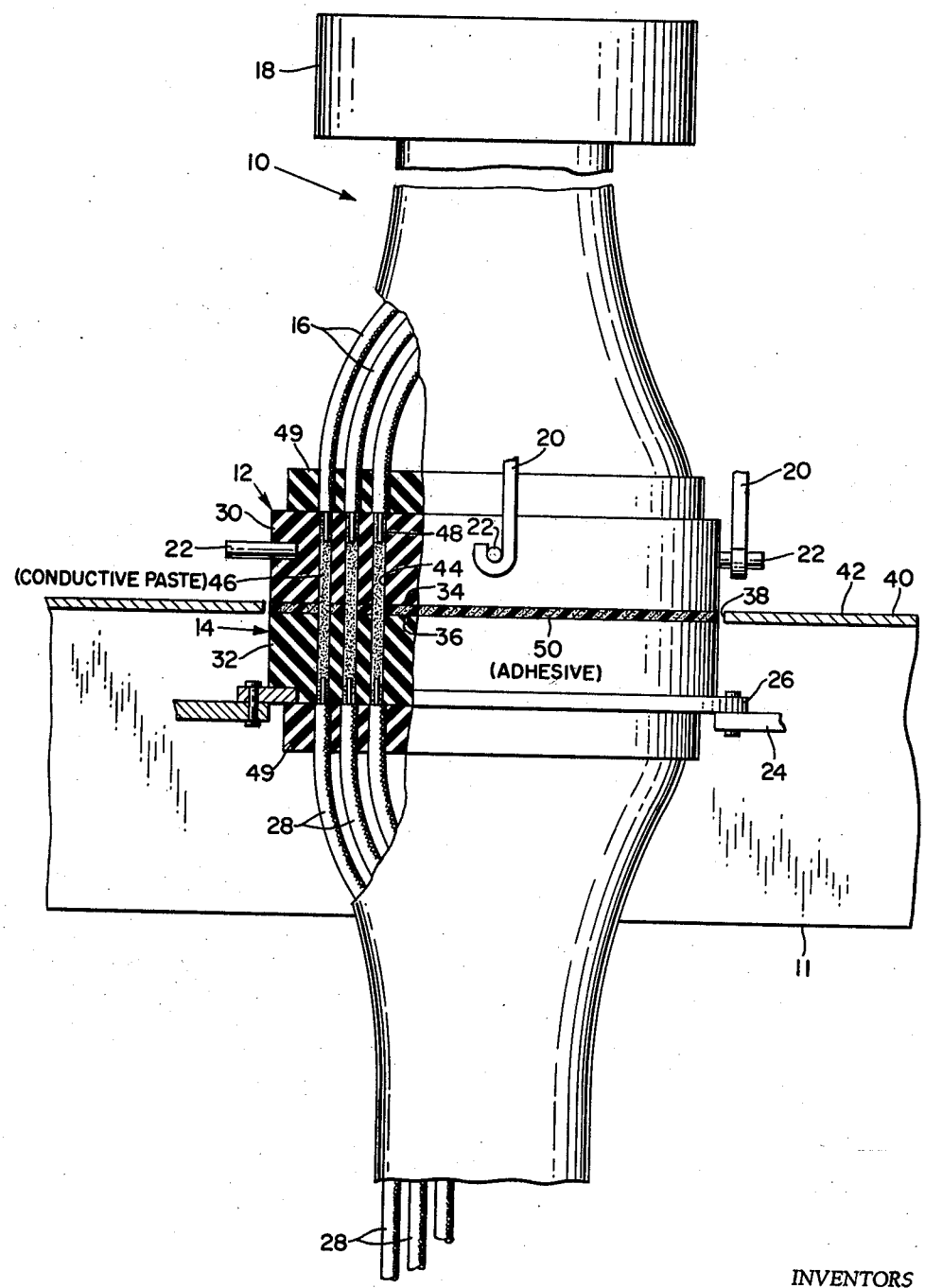
INVENTORS
JAMES M. PERKINS
PAUL F. GRAF
BY FRANK R. BRAUN
ATTORNEY

United States Patent Office 3,184,832
Patented May 25, 1965

3,184,832
METHOD OF MAKING AN EXPENDABLE ELECTRICAL CONNECTOR
James M. Perkins, Iowa City, Iowa, and Paul F. Graf, Ventura, and Frank R. Braun, Camarillo, Calif., assignors to the United States of America as represented by the Secretary of the Navy
Original application June 12, 1961, Ser. No. 116,628, now Patent No. 3,136,842, dated June 9, 1964. Divided and this application Oct. 29, 1963, Ser. No. 319,891
2 Claims. (Cl. 29—155.5)
(Granted under Title 35, U.S. Code (1952), sec. 266)

This application is a division of our patent application Serial No. 116,628, filed June 12, 1961, now Patent No. 3,136,842.

The invention described herein may be manufactured and used by or for the Government of the United States of America for governmental purposes without the payment of any royalties thereon or therefor.

This invention relates to electrical connectors, and more specifically to a method of fabricating an electrical connector having a frangible electrical connection that will separate with a minimum resistant force.

This invention is particularly adapted for use in umbilical connectors that electrically join a missile with the launching structure, which may be an aircraft or a fixed launcher.

As would be expected, many different types of umbilical connectors have been proposed, and for the most part such connectors employ metal pins slidably fitting in female sockets. Although pin-type umbilical connectors have been successfully employed in many different types of installations, they present several disadvantages which the instant invention overcomes.

One disadvantage of pin-type umbilical connectors is the difficulty of protection against moisture which may cause an electrical short. Probably more critical is that in missiles launched in a forward direction, the connector halves must be first ejected apart which necessitates the use of springs, etc. which mechanisms present additional disadvantages. Pin-type connectors also require careful alignment between the connector halves, otherwise they may cause binding and complicate launching. Finally, pin-type connectors usually necessitate recesses or projections on the missile body which present aerodynamic drag on high-performance missiles.

The instant invention provides a separable connector particularly suited for umbilical connections between a missile and its launcher. The connector comprises a pair of connector halves of insulating material adhesively or otherwise secured together along shear surfaces. A plurality of holes are drilled through both connector halves transverse to the shear surfaces and filled with a paste formed of conductive metal particles in a suitable binder which composition hardens to form a frangible material. While the conductive paste is still soft, the bared ends of the conductors are inserted therein until the paste hardens with the bared ends securely fixed in position. Upon hardening, the paste material becomes highly conductive and readily frangible and the connector halves are easily separated by a predetermined tensile force, shear force, or any combintaion of such forces.

The absence of metal pins and receptacles for electrical contact, eliminates friction which is particularly severe at low temperatures in which environment such umbilical connectors must function. The connector assembly may be cast or molded of a suitable nonconductive material that is completely waterproof. The shear surfaces of the missile connector half can be made flush with the missile body avoiding aerodynamic drag, and the connector halves need not be separated in only one direction.

A principal object of this invention is to provide a method for fabricating a separable connector having increased reliability.

Another object is to provide a method of fabricating a connector which eliminates the need for mating connector pins and sockets and ejection mechanisms for such parts, and one which enables separation of the mating parts with a minimum of friction.

Still another object is to provide a separable connector which is simple, inexpensive in construction, and which can be made waterproof.

Other objects and many of the attendant advantages of this invention will be readily appreciated as the same becomes better understood by reference to the following detailed description when considered in connection with the accompanying drawing wherein the sole figure is a longitudinal view of an assembled connector, partially in section to show construction details.

Referring to the drawing where like reference numerals designate similar parts, there is shown in the single figure a novel electrical connector 10 illustrated as an umbilical connection for a missile 11, and comprises a pair of counterpart separable halves 12 and 14. Connector half 12 is adapted to be electrically connected by conductors 16 and a conventional connector 18 to a launching platform (not shown) which may be an aircraft or a fixed structure, being secured thereto by four hooks 20 adapted to engage posts 22 mounted on the connector half. The other connector half 14 is supported on the missile frame 24 by mounting ring 26 and electrically connected to the missile components (not shown) by conductors 28. By such a connection electrical energy can be transmitted between the launcher control station and the missile components for various types of prelaunch operations until the time of launch when the connector halves are separated to disconnect the electrical circuitry.

Connector halves 12 and 14 comprise bodies 30 and 32 made of insulating material, such as nylon, having facing surfaces 34 and 36, respectively, adapted to be abutted in the assembled configuration. Bodies 30 and 32 can be constructed of, or cast as blocks having configurations that can be varied according to the shape of the opening 38 available in the missile skin 40 for this purpose. Abutting surfaces 34 and 36 of the connector halves can be flat to lie in a shear plane 42 tangential to missile skin 40, or the abutting surfaces may be concavo-convex to form a curved shear surface to conform to the curvature of the missile skin avoiding any recesses or projections on the missile skin that might cause a drag force undesirable in high performance missiles.

Both connector bodies are provided with a plurality of spaced apertures 44 extending therethrough normal to the respective abutting surfaces, one aperture for each conductor to be electrically connected. During fabrication, each aperture is completely filled with a paste-like conductive material 46 and while the material is still soft the bared end 48 of the corresponding conductor is inserted therein until the material hardens to anchor the bared end firmly therein and form a good electrical joint. The insulated end of both sets of conductors 16 and 18 may be anchored to their respective connector bodies by a disc 49 made of potting compound.

One suitable conductive material 46 that has been used comprises a compound of 5 gm. of epoxy, 1 gm. hardener, and 27 gm. silver flake, which mixture will set and harden in about six hours. When hardened the conductive paste forms rods, or pins, that are frangible and can be readily parted by a force that may be in shear or tension or any combination thereof in a manner to be described.

Connector bodies 30 and 32 are secured together at their abutting surfaces by any readily separable means, preferably by an adhesive 50, such as one having a silicone rubber base. The type and formulation of adhesive 50 is dependent upon the area of the abutting surfaces, the desired separation force involved in the launch, and the missile operating environment. In one air-to-air missile launch, the adhesive was designed to permit separation of the connector halves by a 40 pound tensile force, the remaining surface of body 32 being smooth and free of any large recesses or protuberances that might create a drag. It is possible that the conductive paste pins could be utilized as the means for securing together the connector bodies.

One of the advantages of the invention device is the simple and inexpensive construction that is possible with such an expendable connector. As an example, one method of fabricating the connector is to first adhesively secure together connector bodies 30 and 32 with posts 22 and mounting ring 26 previously molded therein, making sure that the adhesive completely covers the entire abutting surfaces. Apertures 44 are then drilled through the assembled connector bodies and the adhesive layer, and the apertures thoroughly filled with conductive paste 46. The exposed surfaces of the connector bodies are then cleaned, such as by sandblasting, of any conductive paste to prevent any accidental electrical short between adjacent conductive paste-filled apertures. Then ends of conductors 16 and 28 are then stripped and the bared ends, i.e. ¼″ in length, inserted in the still soft conductive paste. To maintain the assembled position of the conductors, a potting compound is poured around the ends of the conductors and allowed to harden, providing a moisture-proof connector assembly.

In operation, the assembled connector halves are installed on the missile, with the abutting surfaces lying flush with the surface of the missile skin, being the shear surface. The free ends of conductors 16 and 28 are connected to the launching platform and missile components, respectively. The conductors are flexible to absorb any shock due to vibration. Upon launching of the missile, the application of the separation force along the shear surface causes adhesive 50 to part, simultaneously snapping off the plurality of frangible pins of conductive material along the shear surface freeing the connector halves. The shear surface of the missile connector half is relatively smooth and free of protuberances or recesses.

The novel connector of this invention provides a molded assembly which is completely waterproof. The connector assembly is simpler than existing connectors because machining is minimized, and the use of an expendable connector eliminates the tolerances normally required for nonexpendable connectors. The absence of metal pins and female receptacles for the electrical contact eliminates friction that is particularly severe at low-temperature operations. The connector halves separate along the shear surface, which may be along a plane or curved surface conforming to the missile skin, upon the application of the separation force which may be in torsion, shear, or a combination thereof. It is apparent that separation of the connector along a shear plane simplifies the construction in that the need for a means for ejecting the old pin and socket connector is eliminated.

Obviously many modifications and variations of the present invention are possible in the light of the above teachings. It is, therefore, to be understood that within the scope of the appended claims the invention may be practiced otherwise than as specifically described.

We claim:
1. A method of making an expendable connector for joining at least one pair of electrical conductors and separable when a force exceeding a predetermined magnitude is applied thereto comprising the steps of:
adhesively securing together a pair of connector bodies made of insulating material and having substantially planar surfaces to be abutted;
said adhesive when hardened having a known and predetermined separation force;
drilling an aperture completely through said assembled connector bodies for each pair of conductors;
filling each of said apertures with an electrically conductive paste material;
embedding the respective bared ends of each pair of conductors into said conductive paste from opposite ends of the respective apertures; and
allowing said conductive paste to harden and thereby form a frangible conductive connection between the conductors of each of said pairs, said conductive paste when hardened having a known separation force chosen to be equal to, or less than, the predetermined separation force of the hardened adhesive securing together said pair of connector bodies, the separation force of such adhesive in turn being chosen to be equal to, or less than, the predetermined magnitude of the force applied to said connector in order to effect a separation thereof.

2. The method of fabricating a separable umbilical connector for electrically joining a missile to its launcher prior to the launching operation, during which operation the electrical circuit between the missile and its launcher is broken when a separation force of predetermined magnitude is applied to said connector, said method comprising the steps of:
adhesively securing together a pair of connector bodies composed of electrically insulating material and having substantially planar abutting surfaces to be thus adhesively secured, said adhesive when hardened having a known and predetermined separation force;
drilling a plurality of apertures completely through the assembled connector bodies, the number of apertures so drilled being equal to the number of pairs of electrical conductors joining said missile to its launcher;
filling the apertures so drilled with an electrically conductive paste that is capable of hardening over a period of time;
embedding the bared ends of each pair of conductors into said conductive paste from opposite ends of the respective apertures so drilled in said connector bodies; and
allowing said conductive paste to harden to form a frangible electrical connection between each of said pairs of conductors, said conductive paste when hardened having a known separation force chosen to be equal to or less than the separation force applied to the hardened adhesive securing together said pair of connector bodies when the missile leaves its launcher during the launching operation.

References Cited by the Examiner

UNITED STATES PATENTS

| 2,072,850 | 3/37 | Andre | 338—322 |
| 2,845,516 | 7/58 | Jones | 174—84 |
| 2,907,925 | 10/59 | Parsons | 29—155.5 |
| 2,951,421 | 9/60 | Katzen | 339—17 X |
| 3,044,151 | 7/62 | Coler | 29—155.5 |
| 3,079,674 | 3/63 | Shortt | 29—155.5 |
| 3,083,260 | 3/63 | Bird | 339—118 X |
| 3,102,213 | 8/63 | Bedson et al. | 317—101 X |

FOREIGN PATENTS 259,272   10/26   Great Britain.

WHITMORE A. WILTZ, *Primary Examiner.*
JOHN F. CAMPBELL, *Examiner.*